Sept. 7, 1965 M. J. KRAWACKI 3,204,567
ROTARY MOTION APPARATUS
Filed March 6, 1962 8 Sheets-Sheet 1

INVENTOR.
MICHAEL J. KRAWACKI
BY
his ATTORNEYS

INVENTOR.
MICHAEL J. KRAWACKI

Sept. 7, 1965 M. J. KRAWACKI 3,204,567
ROTARY MOTION APPARATUS
Filed March 6, 1962 8 Sheets-Sheet 4

INVENTOR.
MICHAEL J. KRAWACKI
BY
his ATTORNEYS

Sept. 7, 1965     M. J. KRAWACKI     3,204,567
ROTARY MOTION APPARATUS

Filed March 6, 1962                                8 Sheets-Sheet 6

INVENTOR.
MICHAEL J. KRAWACKI
BY
his ATTORNEYS

Sept. 7, 1965                M. J. KRAWACKI                3,204,567
                           ROTARY MOTION APPARATUS
Filed March 6, 1962                                     8 Sheets-Sheet 7

INVENTOR.
MICHAEL J. KRAWACKI
BY
ATTORNEYS

Sept. 7, 1965 — M. J. KRAWACKI — 3,204,567
ROTARY MOTION APPARATUS
Filed March 6, 1962 — 8 Sheets-Sheet 8

INVENTOR.
MICHAEL J. KRAWACKI
BY
his ATTORNEYS

United States Patent Office 3,204,567
Patented Sept. 7, 1965

3,204,567
ROTARY MOTION APPARATUS
Michael J. Krawacki, Englishtown, N.J., assignor to Trojan Corporation, Plainfield, N.J., a corporation of New Jersey
Filed Mar. 6, 1962, Ser. No. 177,909
9 Claims. (Cl. 103—139)

The present application is a continuation-in-part of my copending applications Serial No. 813,952 filed May 15, 1959 and Serial No. 853,912 filed November 18, 1959, now Patent No. 3,033,122, issued May 8, 1962, which, in turn, are continuations-in-part of my copending application Serial No. 775,244 filed November 20, 1958, now abandoned.

This invention relates generally to apparatus such as fluid pumps and motors, in which there occurs an energy transfer between a mechanical part and a liquid or gaseous fluid. More particularly, this invention relates to apparatus of this sort which is characterized by aligned impulsion and rotary motion.

By "aligned impulsion" is meant an energy transfer action between a mechanical part and a fluid wherein the fluid impels the part or is impelled thereby, and wherein the motion of the part is aligned in direction with the movement of the fluid in the course of the energy transfer action. Such alignment is present, for example, in a reciprocating steam engine wherein the motion of the piston is aligned with the direction of expansion of the steam in the cylinder. It is not present in turbo-pumps or turbo-motors wherein the motion of the rotating blades is at right angles to the direction of travel of the fluid contained within the pump or motor. Hence, in respect to the feature of aligned impulsion, the apparatus to which this invention relates is like reciprocating fluid pumps or engines, and unlike turbo-pumps or turbo-motors. However, the apparatus of the present invention is unlike reciprocating machines, and like turbo-pumps or turbo-motors, in that it is characterized by rotary motion. Hence, the apparatus to which this invention relates is rotary motion, aligned impulsion apparatus which combines in one machine the advantage found in reciprocating machines of the high efficiency which is provided by the aligned impulsion, and, also, the advantages found in turbo-machines (which is provided by the rotary motion) of unidirectional continuous operation and of freedom both from mechanical vibration and from fluid vibration (pulsation).

The principal elements of one such rotary motion, aligned impulsion machine are shown schematically in the accompanying first two figures of the figures listed below wherein.

Figure 21:
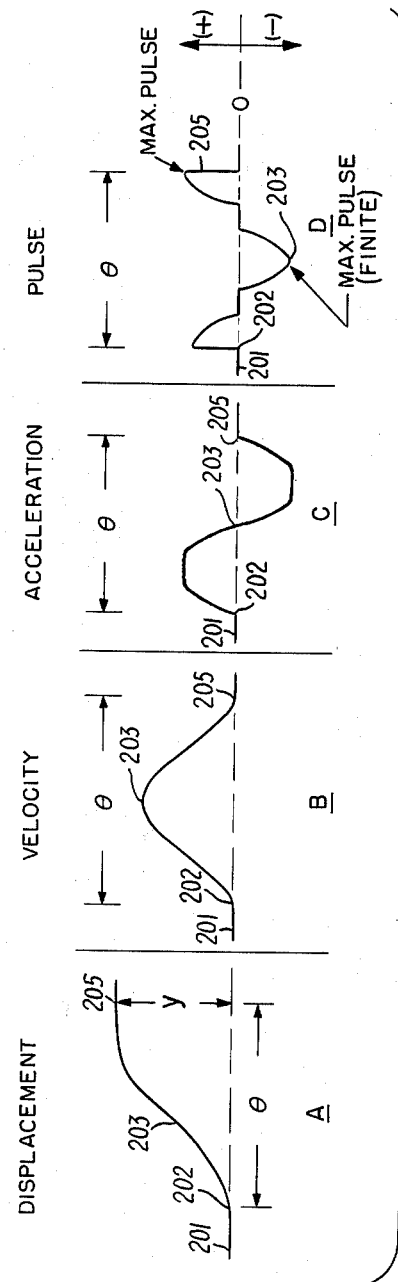

FIG. 21 (containing individual diagrams A, B, C and D) is a graphical representation of the characteristics of the cam constructed in accordance with the present invention.

Figure 1:
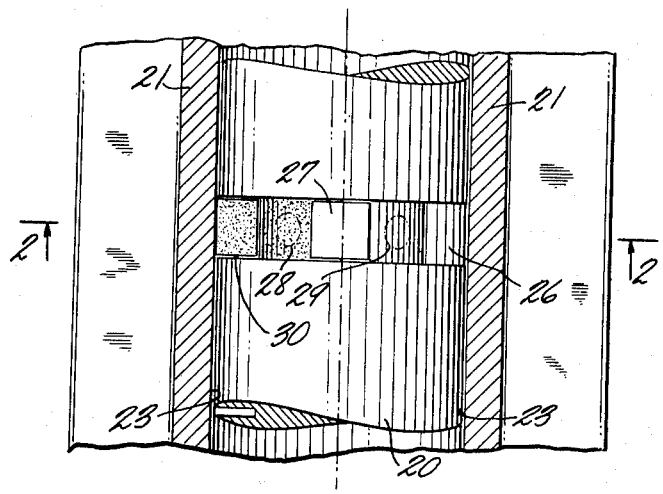
FIG. 1 is a partially cut away and plan view of apparatus according to the invention, as such apparatus may be generally represented.
Figure 2:
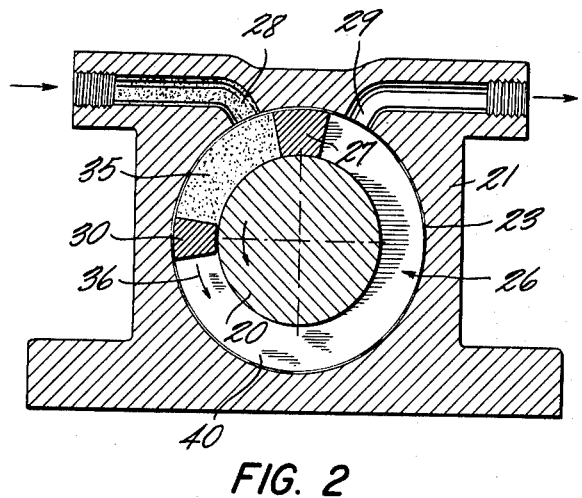
FIG. 2 is a vertical cross section, taken as indicated by the arrows 2—2 in FIG. 1, of such apparatus as it may be generally represented.

In FIGS. 1 and 2 which illustrate the general character of the type of apparatus to which this invention relates, the numbers 20 and 21 refer to a pair of relatively rotatable members in the respective forms of a drum and of a sleeve surrounding the drum.

The sleeve 21 is separated from the drum 20 by a clearance space 23. The clearance between drum and sleeve is selected to permit free relative rotation of these members while, at the same time, limiting, insofar as is practicable, the flow of fluid in the clearance space.

Other elements of the apparatus include a fluid-receiving groove 26 of any suitable cross section, a reaction block 27 seated in the groove to obstruct or impel flow of fluid therein, a high pressure port 28 opening into the groove 26 on one side of the block 27, a low pressure port 29 opening into the groove on the other side of the reaction block, and a vane or piston 30 of any suitable cross section which angularly rotates relative to the block 27. The vane 30 is normally disposed to obstruct or impel flow of fluid in the groove 26. However, as the vane 30 approaches the block 27 in the course of the relative angular movement therebetween, the vane undergoes an additional movement which is transverse to the said relative movement, but which may be axial or radial or part axial and part radial. The first half of this transverse movement momentarily displaces the vane 30 away from its normal groove-obstructing position so as to clear the reaction block 27. The second half of the transverse movement returns the vane 30 to its groove-obstructing position after the vane has passed by the reaction block. A means suitable to produce such transverse movement of the vane is not shown in FIGS. 1 and 2. However, an example of such means will be later described.

Each of the elements in FIGS. 1 and 2 may be one of several. The considered apparatus may include separately, or in any combination thereof, any one or more of the features of one or more annular fluid-receiving grooves, one or more reaction blocks in each groove, and any suitable number of vanes, of which one, some or all may operate either in only one groove or in more than one groove.

If there is more than one groove, the grooves may have differing depths and/or widths, i.e., be of different cross section. The transverse movement of the one or more vanes may be reciprocating, twisting, or oscillatory in character.

In the form of apparatus shown in FIGS. 1 and 2, the sleeve 21 is stationary, the drum 20 is rotatable about its axis, the annular groove 26 is formed in the drum 20, the ports 28 and 29 communicate with the groove 26 through the sleeve 21, the reaction block 27 is coupled in angularly fixed relation with the sleeve 21 to be stationary, and the vane 30 is coupled in angularly fixed relation with the drum 20 to rotate therewith. However, the present invention extends to other forms of apparatus. For example, the drum may be stationary and the sleeve rotatable, in which case the high and low pressure ports will pass through the stationary drum. While the block 27 and the vane 30 are always coupled with opposite ones of the members 20, 21, the block 27 may be coupled to the drum instead of the sleeve, and the vane 30 may be correspondingly coupled to the sleeve instead of the drum. The block 27 may be coupled to either the rotating of the non-rotating one of the members of the drum-sleeve combination. The transverse movement undergone by the vane to pass by the block is in the nature of a relative movement between block and vane, and hence may be produced either, as described, by having the vane transversely movable and the block transversely stationary in an absolute sense, or by having the vane transversely stationary and the block and groove transversely movable, or by having both the vane transversely movable and the block and groove transversely movable. As stated the mentioned transverse movement may be either radially directed or axially directed or part axially and part radially directed i.e., be a motion which is resolvable into axial and radial components.

The apparatus shown in FIGS. 1 and 2 operate as follows as a motor. Gaseous or liquid fluid is introduced into and exhausted from the apparatus at relatively higher and lower pressures by way of the high and low pressure ports 28 and 29 which in this instance act respectively as the inlet port and as the outlet port. The high pressure fluid is represented in FIGS. 1 and 2 by stippling. This high pressure fluid flows from the inlet port 28 into a working chamber 35 whose bounding walls are formed by the annular groove 26, the portion of sleeve 21 which covers the groove, the reaction block 27, and the vane 30. Since the reaction block 27 is stationary and exerts a reactive force on the fluid, the fluid cannot flow angularly in the groove in the clockwise direction. However, since the vane 30 is movable, and since the pressure of the fluid exerts a force on the vane, the vane will be driven counter-clockwise by the fluid. This counter-clockwise rotation of vane 30 is represented in FIG. 2 by the arrow 36.

As the vane 30 moves counter-clockwise, it causes exhaustion through the outlet port 29 of residual fluid in the chamber 40 which is bounded by the groove and sleeve and by the surfaces of the reaction block and vane which are angularly opposite the surfaces thereof which bound the working chamber 35. The vane 30 continues to be driven by the fluid in the working chamber 35 until the vane comes into angular registration with the outlet port 29. Thereupon, the fluid in the working chamber exhausts through the port 29.

Meanwhile, the vane is carried towards the reaction block by the angular momentum of the drum. As the vane approaches the block, the vane is caused to undergo (by means not shown in FIGS. 1 and 2) a first motion which displaces the vane transversely to a position where the vane will clear the block. When the vane has passed the block, it undergoes a second transverse motion which returns it to the normal position wherein the vane obstructs the groove. As the vane now moves away from the reaction block, the space opening in the groove between the block and vane is a space which provides a new working chamber for the high pressure fluid from inlet port 28. This high pressure fluid is received into the new working chamber, and the described cycle begins all over again.

The operation just described is the operation of a fluid motor because the apparatus is supplied with an input of fluid energy, this fluid energy is made available by a drop in the pressure of the fluid as it passes through the apparatus, and the apparatus translates such available fluid energy into mechanical energy which is manifested by the rotation of drum 20, and which may be extracted from the apparatus as an output thereof. Obviously, however, the described apparatus is also adapted to operate as a fluid pump either by reversing the high and low pressure fluid connections thereto, or by reversing the direction of rotation of the drum. When operating as a pump by virtue of a reversal in the direction of drum rotation, the ports 28 and 29 are connected as before to communicate respectively with high and low pressure points of the fluid system, but the low pressure port 29 becomes the inlet port, the high pressure port 28 becomes the outlet port, the direction of rotation of drum 20 is reversed, and an input of mechanical energy is supplied to rotate drum 20 and vane 30. Under such circumstances, the fluid will flow through the apparatus from port 29 to port 28. Also, the input of mechanical energy will be translated into increased fluid energy which is manifested by the increased pressure of the fluid at the outlet port 28 as compared to the pressure thereof at the inlet port 29.

It will be noted that the described apparatus when operating as a motor is bidirectional in the sense that the drum can equally well be rotated in either direction simply by reversing the fluid connections thereof to the external fluid system so that port 29 becomes the high pressure port and port 28 the low pressure port. Similarly the described apparatus when operating as a pump is bidirectional in that by reversing the fluid connections and, also, the direction of rotation of the drum, the direction in which the fluid is pumped can be reversed.

For proper operation, the apparatus of FIGS. 1 and 2 should have in the high pressure line a check valve to prevent a short circuit for fluid from the high pressure port around groove 26 and to the low pressure port at the time vane 30 is passing block 27. Such apparatus should also have a check valve in the low pressure line in order to avoid therein a momentary reversal (due to "back" pressure) of the direction of fluid flow during the time vane 30 is passing block 27. As later described in further detail, the need for such check valves or similar accessories is obviated by employing at least two vanes per reaction block.

Rotary motion, aligned impulsion apparatus of the sort described is generally known to the art. Such prior art apparatus is, however, subject to numerous disadvantages, among which may be mentioned excessive friction and binding between parts, excessive wear of such parts, and excessive vibration. The defects just mentioned are caused primarily by the action on various parts in the machine of forces which are neither balanced, minimized to the practical limit, nor effectively counteracted. Such forces, in general, will vary directly with the pressure of the fluid in the machine or directly with the square of the speed of operation of the machine or directly with both.

When the operating pressure is relatively low, and, also, when the speed of operation is relatively low, the machine known to the prior art will be characterized by wear, friction and vibration to an extent which is undesirable. When the fluid pressure and/or the speed of operation are high, the prior art machines will be characterized by wear, friction and vibration to an extent which renders impractical the use of such machines in high pressure, high speed applications.

It is accordingly an object of the invention to provide rotary motion, aligned impulsion apparatus in which the above mentioned disadvantages of friction, wear and vibration are minimized under all pressure and/or speed conditions.

Another object of the invention is to provide apparatus of the stated sort which is well adapted for use in high speed, high pressure applications thereof.

A further object of the invention is to minimize the force required to impart transverse motion to any vane.

Still another object of the invention is to provide a rotary motion aligned impulsion machine having a cam so designed that the impact forces and the wear between the cam and its follower are minimized.

These and other objects are realized according to the invention as follows:

From the prior discussion it is evident that one or more vanes of the apparatus are driven transversely by a camming means or equivalent means and the vanes are guided in their transverse motion by being received within slots formed in the member (drum or sleeve) with which the vanes are coupled.

The driving force exerted by the camming means on each vane has a center line of action having the same direction as the vane axis. This driving force is opposed by equal and opposite reactive forces, namely the reactive force generated by the acceleration of the mass of the vane and the force generated by the friction inherent in moving the vane in its slot. It will be apparent that the wear and impact forces between the cam and the cam follower constitute a major problem in designing a machine which will operate successfully at very high speeds and for prolonged periods of time. In accordance with the present invention, I design the profile of the cam for the rotary motion apparatus so that both the first and second derivatives of the transverse displacement of the profile relative to the angular displacement thereof are equal to zero at at least one end of the cam profile, that is at the point where the vane transverse motion begins or ends in a given direction. Preferably, such conditions prevail at all ends of the cam profiles.

For a better understanding of the invention, reference is made to the following description, the already described FIGS. 1 and 2 of the drawings, and to the remaining figures of the drawings.

Figure 3:
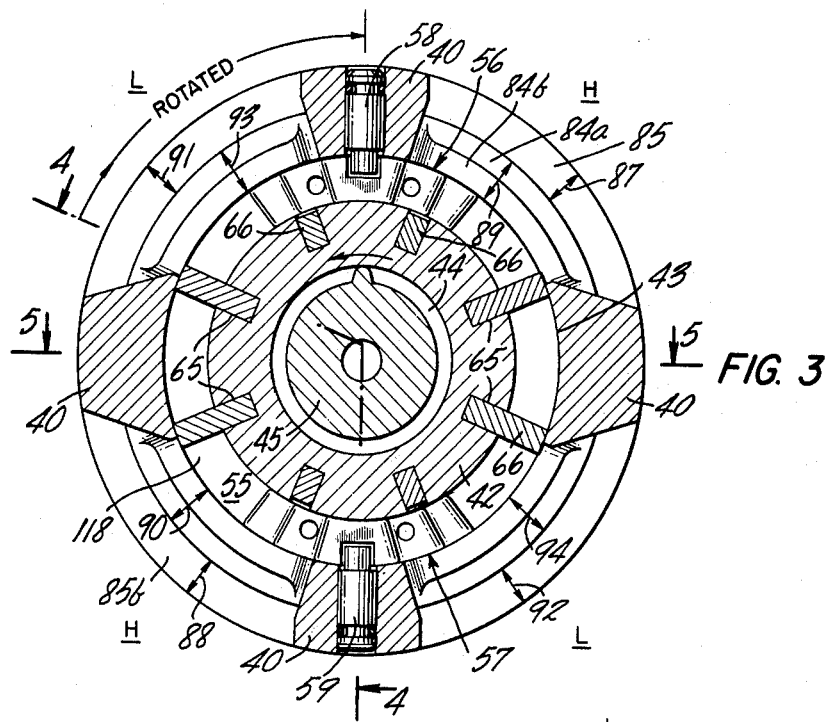
FIG. 3 is an end elevation in cross section of an exemplary practical embodiment of a machine according to the invention, the view in FIG. 3 excluding the outer housing for such machine and being taken as indicated by the arrows 3—3 in FIG. 4.
Figure 4:
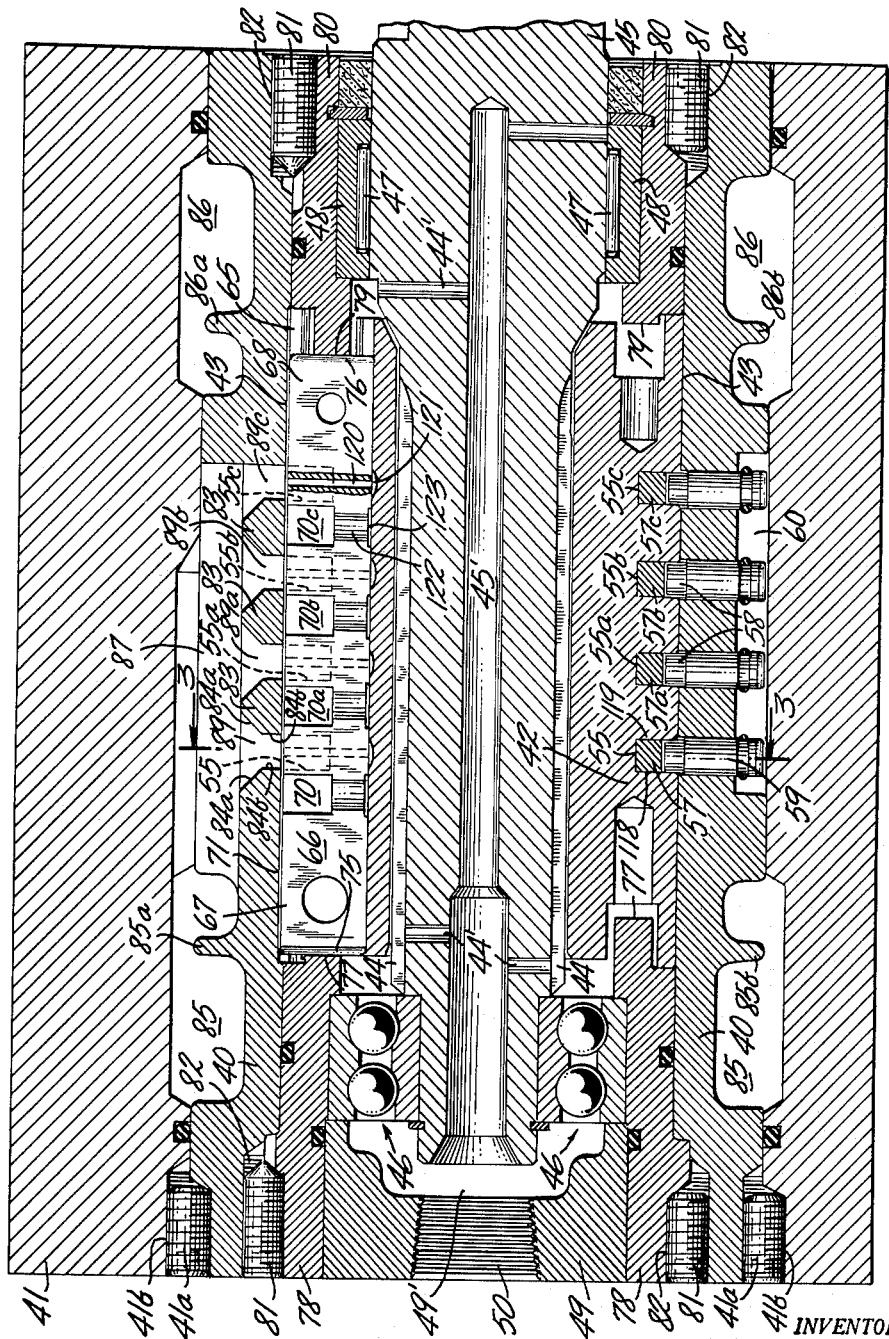
FIG. 4 is a front elevation in cross section of the FIG. 3 machine, the cross section being initially taken as indicated by the arrows 4—4 in FIG. 3, and the upper slanting face of such cross section being then rotated into line with the lower vertical face thereof to arrive at the view of FIG. 4, this view including the outer housing for the machine.

FIGS. 3 and 4 will first be considered. In the embodiment shown in those figures, a stationary bushing 40 is disposed within a cylindrical housing 41 for the apparatus. The inside surface of the bore of the casing and the outside surface of the bushing may have matching slight conical tapers to assure good metal contact between housing and bushing when the latter is axially advanced under pressure into the bore of the former. The axial position of bushing 40 within housing 41 may be adjusted by appropriate rotation of set screws 41a, of which each is threadedly received within a passage 41b, such passage being formed at the interface of housing and bushing so that the circular bore of the passage is provided half by the housing and half by the bushing.

The bushing 40 surrounds and acts as a sleeve for a rotatable drum 42 which is separated from the bushing by an annular, axially extending clearance space 43. The inside surface of the bushing and the outside surface of the drum have matching slight conical tapers permitting adjustment of the amount of clearance therebetween by relative axial adjustment of the drum and the bushing. The clearance between drum and bushing is made as small as is consistent with free rotation of the former within the latter to thereby reduce to a minimum the leakage of fluid through the clearance space.

The cylindrical drum 42 is mounted by a spline coupling 44 on a shaft 45 (FIG. 4) which is mounted for free rotation within the housing 41 by a pair of axially separated bearing assemblies 46 and 47. At its righthand end the shaft 45 passes out of the housing through a gland 48 adapted to act as a fluid seal. At its lefthand end the shaft terminates short of an end plate 49 which closes off this end of the apparatus. Between this end plate 49 and the adjacent end of shaft 45 there is a space 49' defining a reservoir for collecting fluid which may find its way through the space 43 or through the (soon to be described) slots which are formed in the drum 42. In order to equalize fluid pressure at opposite ends of the machine, an axial channel 45' and connecting radial conduits 44' are formed in the shaft 45. In this way, an axial balance is obtained of the fluid pressure forces acting on the drum 42 and on the (soon to be described) vanes which are received within the slots in the drum. A central aperture 50 in the end plate 49 permits drainage from the apparatus of fluid which has leaked away from the operating zone thereof.

Such operating zone is provided by a set of annular grooves 55, 55a, 55b, 55c, which are axially of rectangular cross section, and which are formed as a series of axially spaced recesses in the drum 42. Within each such groove are seated in radially opposed relation a pair of reaction blocks. Thus, for example, the groove 55 contains the radially opposed reaction blocks 56 (FIG. 3) and 57. Of the reaction block pairs contained in, respectively, the other grooves 55a, 55b, 55c, the bottom blocks 57a, 57b and 57c are shown in FIG. 4. In the four grooves, the four bottom reaction blocks are mutually aligned to be bisected by the same vertical plane, while, similarly, the four top reaction blocks are mutually aligned to be bisected by that plane.

The reaction blocks 56 and 57 are maintained in axially fixed relation with the bushing 40 by the pins 58 and 59 (FIG. 3). Similar pins are employed to couple the other reaction blocks in angularly fixed relation with the bushing 40. As shown in FIG. 4, the heads of the four pins for the four bottom reaction blocks are recessed within a slot-like depression 60 formed in the bushing 40. The heads of the pins for the four top reaction blocks are recessed within bushing 40 in a similar manner (not shown).

A further description will later be given of the details of construction of the reaction blocks themselves and of the anchoring means for such reaction blocks.

In addition to the four mentioned grooves 55, 55a, 55b, 55c, there is formed within drum 42 eight axial slots 65 (FIG. 3) disposed at 45° angular intervals about the drum. The slots 65 axially transect the four mentioned grooves and are radially cut into the drum deeper than are those grooves. Received within the slots 65 to be axially slidable therein are a corresponding number of vanes 66. As shown in FIG. 4, each vane 66 has two axially separated end portions 67, 68 and, between those end portions, a series of axially spaced central portions of reduced radial size. Those central portions are created in each vane by a series of rectangular recesses or notches 70, 70a, 70b, 70c which extend into the vane in the radial direction from the margin 71 of the vane which is nearest to the clearance space 43 between the drum 42 and the bushing 40. The mentioned notches correspond to, respectively, the grooves 55, 55a, 55b, 55c. Each notch has an axial and radial extent suitable to contain with clearance either of the reaction blocks within the corresponding groove when the vane is axially shifted rightward from its working position shown in FIG. 4 to the block-passing position for the vane. When a vane is fully in block-passing position, the vertical center line of each of its notches, 70, 70a, 70b, 70c coincides with the vertical center line of the corresponding groove formed in the drum 42. Therefore, when a vane is so axially shifted to its block-passing position, the vane is adapted to pass by either all the top reaction blocks or all the bottom reaction blocks as the rotation of the drum 42 causes the vanes to move angularly relative to the reaction blocks.

As stated, the position which is shown for the vane 66 appearing in FIG. 4 is the working position for that vane. The vanes 66 are so constructed that, when any such vane is disposed in its working position, a solid portion of the vane extends across each of grooves 55, 55a, 55b, 55c to thereby render all grooves obstructed by the vane. Thus, any vane 66 in working position will obstruct the angular flow of fluid in all grooves when the described machine is operated as a motor or, alternatively, will impel the flow of fluid in all grooves when the machine is operated as a pump.

For the purpose of reciprocating each vane 66 back and forth between the working position at which it obstructs the four grooves and the positions at which the vane passes by the reaction blocks in the grooves, each vane 66 is provided at opposite ends with the cam follower faces 75 and 76. The lefthand follower face 75 (FIG. 4) is driven by the camming surface 77 of a cam sleeve 78 inserted into the lefthand end of the machine between the bushing 40 and the end plate 49 and bearing assembly 46. Similarly, the righthand cam follower surface 76 of vane 66 is driven by the camming surface 79 of a cam sleeve 80 inserted into the righthand end of the machine between the bushing 40 and the gland 48. The cam sleeves 78 and 80 are adjustable in axial position relative to bushing 40 by the rotation of set screws 81 received threadedly within passages 82 formed at the interface between the bushing and each cam sleeve, the circular bore of each such passage being thereby provided half by the bushing and half by the associated cam sleeve. The mentioned cam sleeves may be so axially adjusted from time to time in order to take up play between the camming surfaces 77, 79 of the sleeves and the cam follower faces 75, 76 of the vanes.

Pressure from a fluid system (not shown) is manifested within the described machine in a manifold 85 which is the high pressure manifold (or alternatively may be the low pressure manifold) and in a manifold 86 which is the low pressure manifold (or, alternatively, may be the high pressure manifold). Both manifolds are in the shape of annular chambers formed between the housing 41 and bushing 40. The manifold 85 is in fluid communication with a pair of radially opposed fluid distribution conduits 87, 88 which are of arcuate form as seen in cross section (FIG. 3), and which (FIG. 4) each extend axially and to the right of manifold 85 between the housing 41 and the bushing 40. Arcuate fins 85a, 85b act as baffles between manifold 85 and, respectively, the conduits 87 and 88. Of those conduits the former communicates with a series of high pressure ports 89, 89a, 89b, 89c opening into, respectively, the grooves 55, 55a, 55b, 55c. The latter conduit 88 communicates with a series of high pressure ports of which only port 90 is shown (FIG. 3) but which open into the same grooves in radially opposed relation to the first-named high pressure ports.

The manifold 86 is in fluid communication with a pair of radially opposed fluid distribution conduits 91 and 92 which are of arcuate form as seen in cross section (FIG. 3). Arcuate fins 86a and 86b act as baffles between the manifold 86 and, respectively, the conduits 91 and 92. Of the conduits 91, 92 the former communicates with a series of low pressure ports of which only the port 93 is shown (FIG. 3) but which open into, respectively, the grooves 55, 55a, 55b, 55c. The latter conduit 92 opens into a series of low pressure ports of which only port 94 is shown (FIG. 3) but which open into the same grooves in radially opposed relation to the first named low pressure ports.

As shown in FIG. 3, around the groove 55, the distribution of ports is such that high pressure ports alternate with low pressure ports. Furthermore, the ports are distributed in relation to the reaction block units 56, 57, in groove 55 so that each reaction block has one high pressure port and one low pressure port on opposite sides thereof with the nearer edges of the ports extending substantially up to the central or "block proper" section of the reaction block. The distribution which characterizes the port openings into groove 55 is a distribution which is repeated for the three groups of four ports which open into, respectively, the other three grooves 55a, 55b and 55c of the drum 42. Thus, if each of grooves 55a, 55b, 55c is viewed in the same direction as that which yields the cross section of groove 55 which is shown in FIG. 3, each of grooves 55a, 55b, and 55c will be like groove 55 in that the top reaction block will be flanked on the right by a high pressure port and on the left by a low pressure port, and in that the bottom reaction block will be flanked on the right by a low pressure port and on the left by a high pressure port.

The group of axially spaced, angularly aligned ports 89, 89a, 89b and 89c are separated from each other by arcuate ribs 83 which are formed in the bushing 40 by the radial passage therethrough of the port openings. Each such passage is characterized by an axial cross section which resembles a funnel in that slanting chamfer walls 84a taper the cross section from a wide mouth at its radially outward end to a neck at the radially inward end of the passage and formed by vertical walls 84b which bound the passage. Such chamfer walls 84a and vertical walls 84b are shown for port opening 89 in FIG. 4.

Inasmuch as in the considered embodiment the grooves 55, 55a, 55b, 55c and their respectively associated reaction blocks, ports and so on are all substantially identical in structure and operation from groove to groove, the description hereinafter will be confined to the groove 55 and to its associated components. It is to be understood, however, that unless the context otherwise requires, such description applies as well to the other grooves and to their associated reaction blocks, port and the like.

Figure 5:
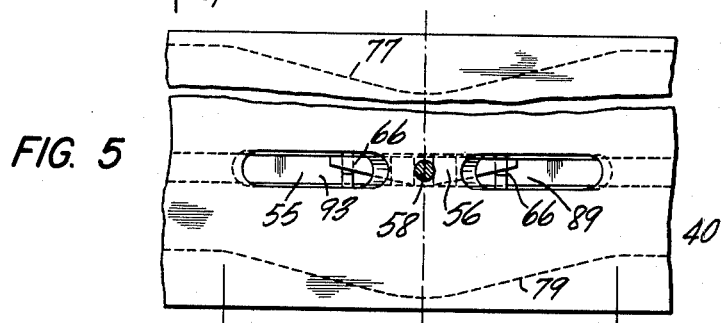
FIG. 5 is a developed plan view, taken over the angular interval indicated by the arrows 5—5 in FIG. 3, of the embodiment of FIG. 3.

FIG. 5 is a developed view of the angular interval around the bushing 40 which includes the reaction block 56 in groove 55, the ports 89 and 93 which open into this groove, and the portions of the camming surfaces 77 and 79 which extend over this angular interval. While the view in FIG. 5 is limited to the angular interval mentioned, the figure is generally illustrative of the space relations obtaining between each reaction block, the associated high and low pressure ports, and the angularly corresponding portions of the camming surfaces.

As shown in FIG. 5, the camming surfaces 77 and 79 are from right to left divided into a dwell section 100, a camming section 101 extending leftward to the axial center line 102 of reaction block 56, another camming section 103 symmetric with cam section 101 about the center line 102 and extending leftward from that center line, and another dwell section 104. For reasons later explained, the shown cam sections 101, 103 each extend at both ends beyond the angular intervals occupied by the corresponding ports 89 and 93.

The shown dwell and cam sections of the camming surfaces are adapted to control as follows the axial position of a vane which is rotating to be represented by a movement from right to left in the developed view of FIG. 5. When the vane is angularly positioned in the dwell section 100, the camming surfaces 77 and 79 maintain the vane axially disposed at the normal position thereof in which a solid portion of the vane obstructs the groove 55 in the drum 42. For this normal working position of the vane, the vane is transversely stationary and the camming surfaces lie in planes which are normal to the axis of the mentioned drum. As the vane moves into the cam section 101, the shown curvatures of the camming surfaces 77 and 79 impart to the vane an axial motion which displaces the vane away from its normal axial position and which is to the right as seen in FIG. 4. The amount of rightward displacement of the vane over camming interval 101 is sufficient to permit the reaction block unit 56 to pass with clearance through the notch 70 in the vane. Hence, in the course of its angular movement, the vane will freely pass by the reaction block.

As the vane in its angular movement makes the transition from camming interval 101 to camming interval 103, the axial motion of the vane changes from a motion of displacement to a motion of replacement which results at the end of the camming interval 103 in a return of the vane to its working position. The vane remains in this last-named position over the angular interval represented by the dwell section 104, and until such time as the vane is again given a new axial motion for the purpose of clearing the reaction block unit 57 which, as shown in FIG. 3 is displaced by 180° from the reaction block unit 56

The camming surfaces, in order to reciprocate the vanes, must contact the vanes to impart accelerating and decelerating forces thereto. Over a period of time such forces and the motions of the vanes will tend to produce substantial wear and impact on the camming surfaces, and, also, on the vanes. Applicant has found, however, that this wear can be minimized by having the camming intervals of the camming surfaces conform to a curve for which, mathematically speaking, the first derivative is zero, and, also, the second derivative is zero preferably at both of the two points on the curve which respectively correspond to the beginning and end of the camming intervals. A curve having such slope characteristics can be readily derived by mathematical procedures known to the art.

In machines of the type here concerned, the cams which control the transverse motion or displacement of the vanes have certain characteristics at the ends where the profile meets the dwell sections. Here the vane transverse velocity is changed from dwell (i.e., zero velocity) to a finite velocity, depending on the profiles used. This velocity change is accompanied by an acceleration of the vanes. Prior machines had cams which produced a sudden acceleration at the ends of the cams. Furthermore, and of great significance, is the fact that, as mathematically derived from the dwell and vane-displacing sections of the cam employed, the slope of the acceleration curve in these prior machines at these points is infinite. This slope is called the third derivative or the "pulse." The pulse is the measure of the rate of change of acceleration and can be considered as the suddenness of application of the accelerating force.

Any acceleration induces a force reaction and the reaction (inertial) force is proportional to acceleration. The shape and the continuity of the acceleration curve are therefore of great significance. At points where the mathematical acceleration curve is discontinuous (theoretically infinite pulse) a sudden application of inertia forces is realized. This action produces a shock or impact between the cam and cam follower. The acceleration curves of the cams heretofore used in rotary motion machines have had discontinuities at the ends of the cams which have produced in effect an infinite pulse at these points. Therefore, the profiles of such cams incorporated impractical conditions of forces and these forces produced the wear and destruction of the cam surfaces which caused or contributed to the failure of the machines.

The machine of the present invention, on the other hand, has a cam profile such that at the end thereof both the first and second derivatives are zero. In addition, we use profiles of such shape and continuity that will produce smooth vane motion at all points. The displacement, velocity and acceleration curves will be continuous. Furthermore, the pulse is, both mathematically and practically speaking, finite and has a value that induces a stress below the yield point of the metal forming the cam surface and the cam follower surface.

Referring to FIGURE 21 and particularly 21A, this design represents the actual shape of the cam surface where the abscissa $\theta$ represents the angular movement or rotation of the vane and the ordinate "$y$" represents the axial or transverse displacement of the vane. At position 201 on the cam curve shown in FIGURE 21A, and also as indicated in FIGURES 21B, C and D, the vane will still be in the dwell period and moving toward the right in the diagram. It will not at that time have been subjected to any transverse force from the cam. At the point 202, however, the vane reaches the beginning of the cam profile and will commence its transverse motion at a velocity varying with the angular position as represented by various points along the curve of FIGURE 21B. The acceleration likewise will vary with the angular movement in accordance with the position on the cam surface as represented by the curve shown in FIGURE 21C. The significant point, particularly in distinguishing the present invention from rotary machines of the prior art, is illustrated in FIGURE 21D. At position 202, it is seen that the value of the pulse as mathematically derived from the curves A, B and C of FIG. 21 is not an infinite but is a finite value. This means that wear and impact between the cam and the cam follower will be greatly reduced and the life of the machine will be greatly prolonged.

Following the motion of the vane further, at approximately the mid-point 203 of the cam, which represents a point of inflection of the curve, it will be found that there is another point of maximum pulse which in this instance is in a negative direction. Here again, however, the pulse value as mathematically derived is finite rather than infinite which again contributes to decrease in force and impact between the cam and its follower.

Finally, at position 205 where the vane reaches another position of dwell, there is another point of maximum pulse but here again the pulse value as mathematically derived is finite rather than infinite.

Thus, the pulse or the slope of the computed acceleration curve at any point for the cam of the present invention will at most have a finite value (which may be zero) thereby reducing the impact or shock loads to a value close to 1.06 $F_y$ or less, that is, 1.06 times the force generated by the inertia of the vane.

From the description already given of the generalized form of apparatus shown in FIGS. 1 and 2, and from the foregoing description of the practical embodiment shown in FIGS. 3 and 4, the operation of the FIGS. 3 and 4 embodiment should be obvious. If the vanes 66 are impelled by fluid which enters by the high pressure manifold 85 and leaves by the low pressure manifold 86, the drum 42 will rotate clockwise as seen in FIG. 3, and the apparatus will act as a motor. If, on the other hand, the vanes 66 impel fluid which enters by low pressure manifold 86 and which leaves by high pressure manifold 85, the drum 42 will be rotated counterclockwise, as seen in FIG. 3, to provide this impulsion action, and the apparatus will operate as a fluid pump. The apparatus can also be converted from a motor to a pump by employing the same clockwise direction of rotation as before of the drum but by reversing the fluid connections to manifolds 85 and 86 so that 85 becomes the low pressure manifold and 86 becomes the high pressure manifold.

Figure 6:
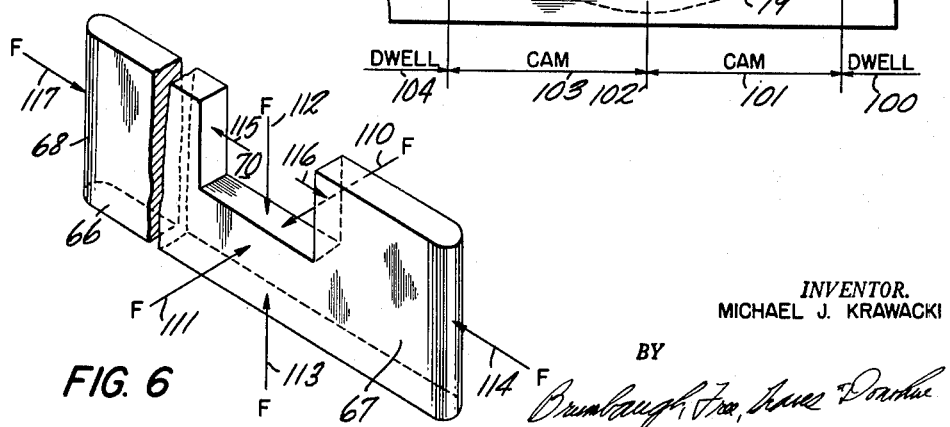
FIG. 6 is an isometric view showing in schematic form one of the vanes in the FIG. 3 embodiment, and the forces exerted on such vane.

One of the troublesome problems encountered in apparatus of the sort described is the problem of balancing or otherwise counteracting the fluid pressure forces which act on various mechanical parts. Ideally, such balance or counteraction should be attained in all three of the angular, radial and axial directions which characterize the machine. For a better understanding of what is meant by such balance or counteraction in all three directions, reference is made to FIG. 6 which shows in schematic form one of the vanes 66 of the described apparatus. As indicated by this figure, the represented vane 66 is subjected to leftwardly and rightwardly directed angular forces, represented by the arrows 110, 111; to upwardly and downwardly directed radial forces represented by the arrows 112, 113; and to leftwardly and rightwardly directed axial forces represented by the arrows 114, 115 for leftward forces, and by the arrows 116, 117 for rightward forces. Most of these forces are created by the pressure of the fluid in the apparatus. In my copending application Serial No. 853,912 filed November 18, 1959, I discuss in some detail various mechanisms and arrangements for balancing or otherwise neutralizing these fluid pressure forces.

In the apparatus, the vanes 66 are subjected to a fluid pressure force which acts in the radially inward direction. This force tends to press the vanes against the bottom of the axial slot 65 to thereby render it difficult to reciprocate the vanes in the slots.

The problem just mentioned may be overcome in the presently described apparatus by providing the following elements which are shown in FIG. 4:

(a) Aperture 120 passing radially through each vane 66 and axially disposed so that each aperture is at the center of a corresponding one of the grooves 55, 55a, 55b, 55c, when the vane is in working position;

(b) Cavities 121 formed in the bottom of each slot 65 directly below grooves 55, 55a, 55b, 55c, respectively, each cavity being axially coextensive with its corresponding groove, and one of the apertures 120 opening into each cavity;

(c) Passage 122 extending from the central notches of each vane 66 to the bottom margin of the vane such passages being provided, for example, by shallow, radial extending channels formed on both sides of the vane below the notches; and (d) Recesses 123 formed in the bottom margin of each vane 66 directly below the notches thereof, each such recess being axially coextensive with the corresponding notch and being in fluid communication with the channel 122 extending radially inward from that notch.

The above-described combination of elements serves to equalize the fluid pressure forces which act upon the top and bottom of each vane. The equalization of such forces eliminates much of the friction involved in moving the vanes in their slots and thereby decreases the pressure between the cam and follower. The feature of providing the structure just referred to to balance the radial force hydraulically are described more fully and claimed in my copending application Serial No. 813,592 filed May 15, 1959.

Figure 7:
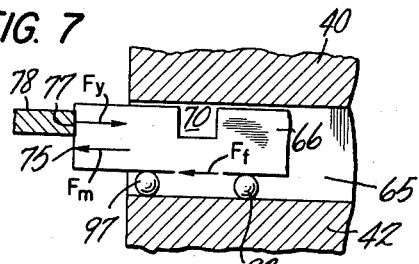
FIG. 7 is a schematic view in side elevation of a vane in a machine of the type shown in FIG. 3, and of the action of forces thereon.

It is possible to counteract the tendency of the radial inward fluid pressure forces to lock the vanes in their slots by providing ball bearing or similar rolling anti-friction bearing mountings in the vanes. In connection, however, with such type of mountings (and with other types of mountings as well), there arises the problem which is illustrated in FIG. 7. In the schematic diagram of this figure, a vane 66 is represented as being supported above the bottom of its slots 65 by the ball bearings 97 and 98, the vane being driven from left to right by the camming surface 77 of the cam sleeve 78. To produce this driving action, the camming surface 77 exerts on the vane 66 a force which, together with its center line of action, is indicated by the arrow $F_y$. This driving force is opposed by two forces, namely (a) a force which, together with its center line of action, is indicated by the arrow $F_m$, and which is equal to the mass of vane 66 as multiplied by its acceleration; and (b) a force which, together with its center line of action, is indicated by the arrow $F_f$, and which is a frictional force exerted by the bearings 97, 98 on the bottom of vane 66. The resultant of forces $F_m$ and $F_f$ is a force which acts in the opposite direction to driving force $F_y$ and which is equal in magnitude thereto, but which has a center line of action displaced radially inward of the center line of action of the force $F_y$. This radial displacement between driving force $F_y$ and the resultant of forces $F_m$ and $F_f$ produces on vane 66 a clockwise moment tending to cant the vane and thereby either force the lefthand end of the vane against bushing 40 or, alternatively, force the righthand end of the vane (not shown) against the bottom of slot 65. In other words, the described camming of the vane tends to lock the vane against movement in its slot.

Figure 8:
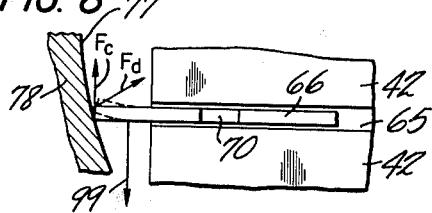
FIG. 8 is a schematic plan view of a vane in a machine of the type shown in FIG. 3, and of the action of forces thereon.

Another vane mounting problem is illustrated schematically in FIG. 8. In this last-named figure, the drum 42 is assumed to be rotating so as to product peripheral movement of the vane 66 in the direction indicated by the arrow 99. The camming surface 77 of cam sleeve 78 is inclined relative to this direction of peripheral movement so as to axially displace the vane 66 from left to right within its slot 65. The drum 42, vane 66 and camming surface 77 have a relative disposition such that the lefthand end of vane 66 projects outwardly of the lefthand end of drum 42 in order to make contact with the camming surface.

In this situation the inclination of camming surface 77 causes this surface to exert on vane 66 a driving force $F_d$ which is at an angle to the axis of the vane, and which accordingly has a component $F_c$ acting on the lefthand end of the vane at right angles to its axis. Inasmuch as the projecting portion of lefthand end of the vane is in the nature of a cantilever beam in that no lateral support is provided for such portion except at its base, the effect of the action of the component $F_c$ is to produce a significant lateral deflection of the unsupported vane portion. The lateral deflection will, when present, serve as another factor tending to cause jamming of the vane against movement in its slot.

Figure 10:
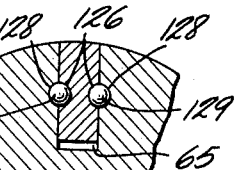
FIG. 10 is a view in cross section taken as indicated by the arrows 10—10 in FIG. 9 of the modified vane.
Figure 11:
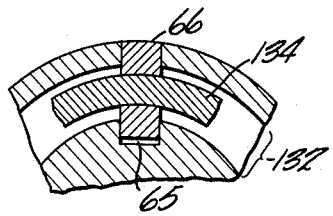
FIG. 11 is a view in cross section, taken as indicated by the arrows 11—11 in FIG. 9 of the modified vane.
Figure 9:
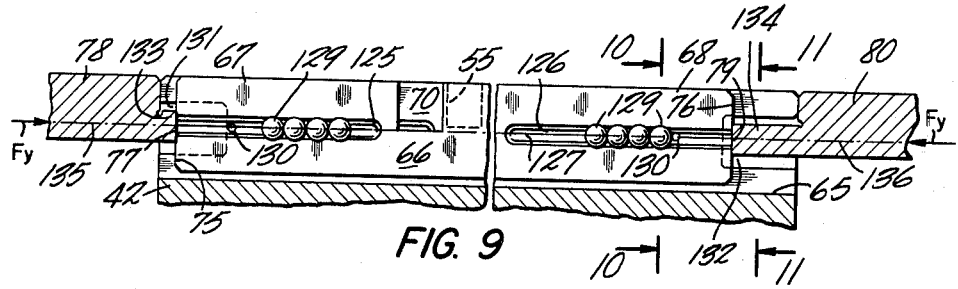
FIG. 9 is a detail view in front elevation and partially in cross section, of a modified vane of the FIG. 3 machine.

The problems illustrated in FIGS. 7 and 8 are overcome by the vane and cam construction shown in FIGS. 9, 10 and 11. In this construction, a pair of rounded grooves 125 are formed on opposite sides of vane 66 to extend inwardly from its lefthand end face 75. A similar pair of grooves 126 are formed on opposite sides of vane 66 to extend inwardly from its righthand end face 76. The center lines of all grooves coincide with the axial line 127 which is the center line of mass for vane 66 in the sense that the mass of the vane disposed radially outward of line 127 equals the mass of the vane disposed radially inward of that line. Because of the notches which are formed in vane 66, the center line 127 of mass does not necessarily coincide with the vane's geometric center line, i.e., that line which lies halfway between the radially inward and outward margins of the vane.

As shown in FIG. 10, the rounded grooves 126 in vane 66 are matched by a pair of rounded grooves formed in the side walls of slot 65. Similarly, the grooves 125 of the vane are matched by rounded grooves (not shown) formed in the mentioned side walls of the slot. Each vane groove and each matching slot groove form a guideway within which is received a set of ball bearings 129.

The ball bearings are retained within such guideway by pins 130 which pass crosswise through vane 66 to project on both sides of the vane into the grooves on opposite sides thereof.

As will be noted from FIG. 10, the ball bearings 129 support vane 66 in such a manner that the vane is held above the bottom of slot 65, is also held away from the side walls of the slot, and, further, is constrained so as not to be removable from the slot by force applied in the radially outward direction. Thus, the described ball bearing mounting for the vane has a number of advantages. For example, the mounting precludes the generation of a large frictional drag opposing axial motion of the vane and due to the pressing of the vane against the bottom of its slot by fluid pressure force acting radially inwardly on the top margin of the vane. Furthermore, inasmuch as the mounting holds the vane away from the sides of its slot to thereby maintain sidewise clearance at all times between vane and slot, the mounting precludes the development of friction force opposing axial motion of the vane and arising out of a pressing of the vane against one side of the slot as a result of an unbalance of the fluid pressure forces acting on opposite sides of the vane. Still further, in the instance where the described machine is run at high speed, the ball bearing mounting of FIG. 9 precludes the throwing of a vane out of its slot by centrifugal force.

In the construction shown in FIGS. 9 and 11, the vane 66 is contacted by the camming surfaces 77, 79 in the following manner. The drum 42 has formed therein, at its lefthand and righthand ends, respectively, a pair of angular channels 131 and 132 of rectangular cross section which extend axially into the drum from those ends. The channels 131 and 132 transect all of the slots 65 which are formed in the drum. The cam sleeve 78 has formed at its righthand extremity an annular flange 133 which projects axially into channel 131 so as to dispose all points on the camming surface 77 within that channel. Similarly, the cam sleeve 80 has formed at its lefthand extremity an annular flange 134 which projects axially into channel 132 so as to dispose all points on the camming surface 79 within that last-named channel. Because the camming surfaces 77 and 79 are both insheathed by the drum throughout their entire peripheries, there is no time during the cycle of axial reciprocation of the vane in which a portion of the vane projects beyond its slot 65. Hence, all portions of the vane receive lateral support at all times and there cannot occur the undesirable "cantilever" deflection which is illustrated by FIG. 8.

Besides being axially located within channels 131, 132 of the drum 42, the camming surfaces 77 and 79 are radially located in relation to the vane 66 in such manner that the driving force $F_y$ exerted by those surfaces have center lines 135, 136 which coincide with and are extensions of the center line of mass 127 of the vane 66. Because of this coincidence and because, as described, the ball bearings 129 which mount vane 66 are disposed along the common center line for the driving forces and for the vane mass, there is no tendency for the vane to become canted in its slot as the vane is driven back and forth by the cams. Hence, the construction shown in FIG. 9 eliminates the problem discussed in connection with FIG. 7.

Figure 12:
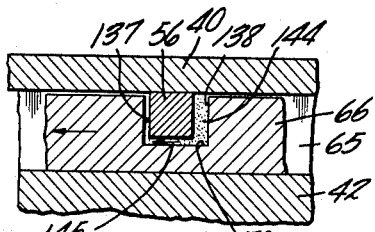
FIG. 12 is a view in side elevation and vertical cross section showing in detail the cooperation between a vane and a reaction block in the FIG. 3 embodiment.

Referring to FIGURE 12, as a vane 66 reciprocates back and forth in its slot in order to pass by a reaction block, there is a tendency for fluid to be trapped in the space between the block and one of the sidewalls 137, 138 of the rectangular recess 70 in the vane. The fluid is present in the space 144 between the right end of the wall 138 of the recess 70 and the right end surface of the block. The radial depending of the recess 70 creates within the slot 65 an axially running passageway 145 between the bottom of the reaction block and the radial inward margin of the recess 70, thus permitting flow of fluid in substantial amount from one side to the other of the reaction block thereby relieving fluid pressures on the block tending to be created by movement of the vane. Other means may be employed to avoid fluid trapping. One or more apertures may be formed in the reaction block to pass axially therethrough. Such means are described more fully and claimed in my copending application Serial No. 4,725 filed January 26, 1960.

Figure 13:
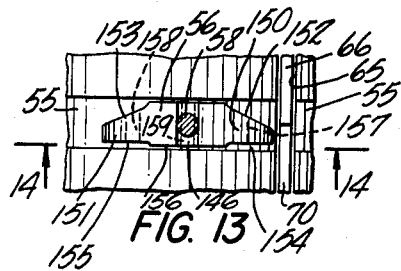
FIG. 13 is a plan view showing details of a reaction block in the FIG. 3 embodiment.
Figure 14:
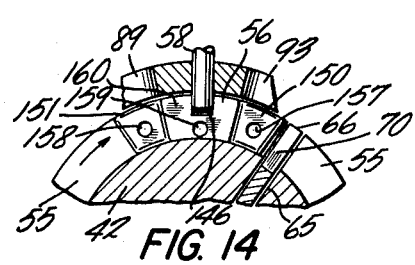
FIG. 14 is a view in front elevation and in vertical cross section, taken as indicated by the arrows 14—14 in FIG. 13, of the reaction block shown in FIG. 13.

FIGS. 13 and 14 show details of the reaction blocks used in the described apparatus, and of the mode of coupling those reaction blocks to the bushing 40. As indicated by those figures, the reaction block 56 is anchored to the bushing 40 by the pin 58 which passes through an aperture in the bushing and into an axial slot 146 which is formed in the block. The pin thereby couples the block in angularly fixed relation with the bushing. At the same time, relative axial movement can take place between the pin and the axial slot 146 in which the pin rides. Hence, the reaction block 56 is adapted to move axially to thereby adjust itself to a shift in the axial position of the groove 55 relative to the bushing 40. This relative shift in axial position between groove and bushing is likely to take place in small amounts over a period of time because of wear induced in the described apparatus during continued operation thereof. Also, irrespective of wear, some shift may take place in operation because of differences in thermal expansion of various parts of the machine.

While the described pin and slot coupling provides the desired effect of self adjustment of the reaction block to slight shifts in axial position of the groove 55, an inevitable result of such type of coupling is the creation of a certain amount of play in the seating of the block in the groove 55. This play tends to get worse as the groove and block wear. Also, the block is subjected to an unbalance of angularly directed fluid pressure forces in that a high pressure port is located on one side of the block, and a low pressure port is located on the other side thereof. These two factors of play in the mounting of the block and of an unbalance of the angular pressure forces thereon, are factors which, in combination, will tend to cant the block in the groove. However, such canting is prevented in the presently described apparatus by two wing-like projections 150 and 151 which extend outwardly from opposite sides of the reaction block proper and into the annular groove 55. As shown in FIG. 14, the extensions 150 and 151 are arcuately curved to fit snugly in the annular groove 55.

The extensions 150 and 151 are also shaped, as shown in FIG. 13, to respectively have the tapers 152, 153 on the sides thereof which would be to the right in FIG. 4, and to respectively have the shoulders 154, 155 on the sides thereof which would be to the left in this last-named figure.

The efficiency of operation of the apparatus can be maximized by improving the angular interval over which each vane is maintained axially displaced from its normal working position for the purpose of allowing the vane to pass by a reaction block. This feature is described more fully and claimed in my copending application Serial No. 853,912 filed November 18, 1959. In the same application, there is described in detail the derivation of a mathematical relationship between the power output of the machine and the configuration of the cam surface. It will be appreciated that the present cam will therefore preferably be formed in the same way.

Coming now to the matter of improving the capacity as a pump of the described machine, for any one groove the capacity C per block is given by:

$$C = hwv \qquad (1)$$

where $h$ equals the groove width, $w$ is depth and $v$ is the peripheral velocity of the vanes relative to the block.

The product $hwv$ also expresses horsepower per block per groove when the machine acts as a motor. The peripheral velocity $v$ is, of course, equal to the centroidal radius of the cross sectional area of the groove times the angular velocity at that radius of the vanes relative to the block.

Figure 15A:
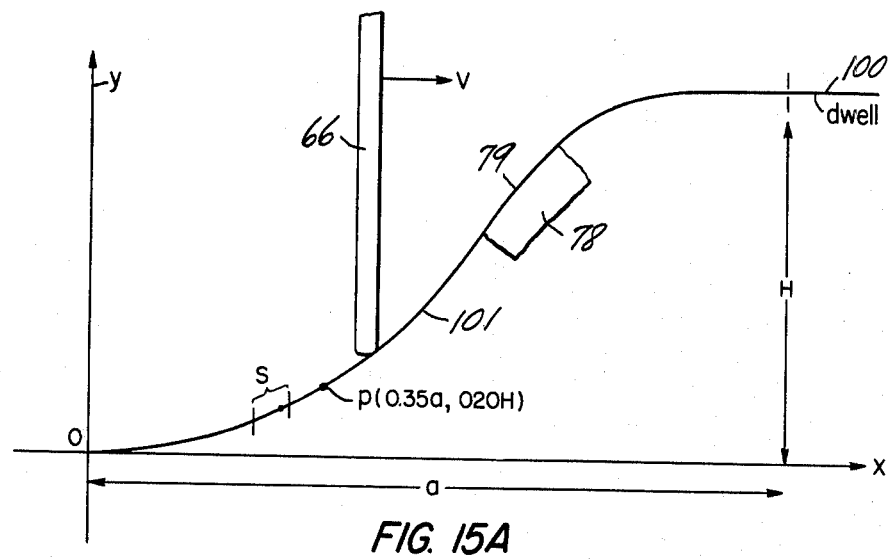
FIGS. 15A and 15B are adaptations of the developed view in FIG. 5 and are schematic diagrams of aid in explaining certain quantitative relations inhering in the FIG. 3 machine.

For fixed values of $h$, $w$ and the centroidal radius of the groove, evidently the capacity C increases in proportion with $v$. However, $v$ cannot be increased without limit. For an understanding of what determines the maximum permissible value of $v$, reference is made to FIGS. 15A and 15B. FIG. 15A illustrates schematically the camming section 101 of the camming surface 79 (FIG. 5). For the purpose of FIG. 15A, the vane 66 is assumed to be moving from left to right with velocity $v$. As the vane so moves from origin 0 to the point where camming section 101 joins dwell section 100, the vane is axially thrown in the $y$ direction by the distance H. The throw H in practice always exceeds somewhat the width $h$ of the groove but theoretically can approach $h$. Hence, for analysis purposes, expression (1) can be written in the form:

$$C = Hwv \quad (2)$$

The cam section 101 occupies an interval $a$ along the $x$ axis between origin 0 and the point of joinder with dwell section 100. This interval $a$ will be assumed to be variable, the same assumption being made at a later time for the interval H. However, the profile of section 101 is treated herein as constant in the sense that the $x$, $y$, coordinates of any point on this section will be the same for all values of $a$ and H when the $x$ coordinate is expressed as a percentage of $a$ and $y$ coordinate is expressed as a percentage of H. Thus, for example, the $x$, $y$ coordinates for the shown point $p$ will always be, say, $0.35a$, $0.20H$, however, $a$ and H may vary.

Figure 15B:
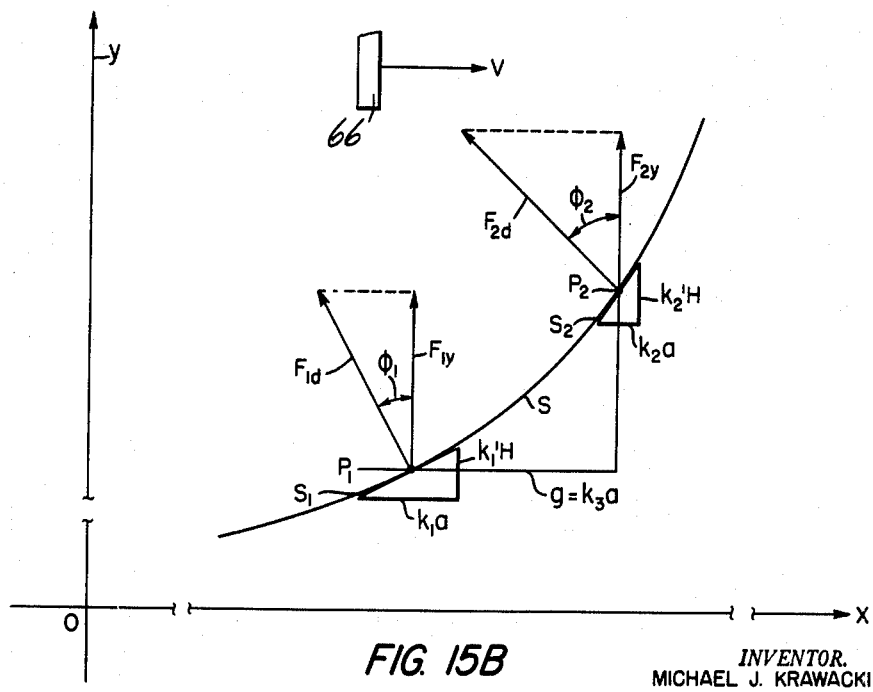

FIG. 15A shows for the camming section 101 a segment S which is reproduced in enlarged form in FIG. 15B. Referring to this last-named figure, the points $P_1$ and $P_2$ are points in S which are displaced from origin 0 by a fixed percentage of $a$ as, say, 27% of $a$ for $P_1$ and 27.01% of $a$ for $P_2$. The horizontal interval $g$ between $P_1$ and $P_2$ may be expressed as $k_3a$ inasmuch as when $a$ increases, $g$ increases proportionately.

The segment S at point $P_1$ and $P_2$ has, respectively, the slopes $s_1$ and $s_2$. These slopes $s_1$ and $s_2$ may be equated to, respectively, the expressions $k'_1 H / k_1 a$ and $k'_2 H / k_2 a$ inasmuch as such slopes vary inversely with $a$ and directly with H. Thus, for example, if $a$ is doubled in value, each of $s_1$ and $s_2$ will be halved in value but if H is doubled in value $s_1$ and $s_2$ will likewise be doubled in value.

As vane 66 moves with peripheral velocity $v$ over segment S to arrive at points $P_1$ and $P_2$ at, respectively, the times $t_1$ and $t_2$, the axial or $y$ velocities of vane 66 at those points are given by the expressions:

$$y'_1 = S_1 V \quad (3)$$
$$y'_2 = S_2 V \quad (4)$$

Further, the average axial or $y$ acceleration of vane 66 between points $P_1$ and $P_2$ is $$y'' = \frac{S_2 V - S_1 V}{t_2 - t_1} \quad (5)$$

However, $(t_2 - t_1)$ equals $g/v$. Therefore $$y'' = \frac{(S_2 V - S_1 V) V}{g} \quad (6)$$

$$y'' = \frac{(S_2 - S_1) V^2}{k_3 a} \quad (7)$$

or $$y'' = \frac{(k'_2 H / k_2 a - k'_1 H / k_1 a) V^2}{k_3 a} \quad (8)$$

or $$y'' = k_4 H V^2 / a^2 \quad (9)$$

The force $F_y$ exerted by segment S in the axial direction on vane 66 is equal to the constant mass of the vane times the acceleration imparted thereto. In other words $$F_y = my'' \quad (10)$$

or from (9)

$$F_y = k_5 H V^2 / a^2 \quad (11)$$

However, the force $F_y$ is a component of the force $F_d$ exerted by the segment S at any point thereon in a direction normal to the slope of the segment at that point. Thus, as shown at point $P_1$, the forces $F_{1d}$ and $F_{1y}$ form a right triangle having $F_{1d}$ for the hypotenuse and $F_{1y}$ for one side thereof. This triangle is similar to the right triangle at $P_1$ which defines the slope $s_1$ and which has the sides $k'_1 H$ and $k_1 a$ and, accordingly the hypotenuse $$\sqrt{(k_1 a)^2 + (k'_1 H)^2}$$

The legs $F_{1d}$ and $F_{1y}$ of the force triangle correspond with the legs $$\sqrt{(k_1 a)^2 + (k'_1 H)^2}$$

and $k_1 a$ of the similar slope triangle. Therefore:

$$\frac{F_{1d}}{F_{1y}} = \sqrt{\frac{(k_1 a)^2 + (k'_1 H)^2}{k_1 a}} \quad (12)$$

or $$F_{1d} = F_{1y} \sqrt{\frac{(k_1 a)^2 + (k'_1 H)^2}{k_1 a}} \quad (13)$$

Similarly, for point $P_2$ it can be shown that:

$$F_{2d} = F_{2y} \sqrt{\frac{(k_2 a)^2 + (k'_2 H)^2}{k_2 a}} \quad (14)$$

Hence, for any point:

$$F_d = F_y \sqrt{\frac{K a^2 + K' H^2}{k a}} \quad (15)$$

and substituting the value for $F_y$ expressed in (11) into (15), there is obtained:

$$F_d = k_5 H V^2 / a^2 \sqrt{\frac{K a^2 + K' H^2}{k a}} \quad (16)$$

or $$F_d = k_6 H V^2 / a^2 \sqrt{\frac{K a^2 + K' H^2}{a}} \quad (17)$$

Now if $\phi$ is the angle at any point on $s$ which exists between the forces $F_d$ and $F_y$ at that point, and which is known as the "pressure angle" for that point, it is the case that:

$$\sec \phi = \sqrt{\frac{K a^2 + K' H^2}{k a}} \quad (18)$$

and expression (16) becomes:

$$F_d = [k_6 H V^2 / a^2] (\sec \phi) \quad (19)$$

I have found that the factor which ultimately limits the improvement in capacity or horsepower of the described machine is the stress set up in axially driving the vanes by the camming surfaces. In other words, no matter what changes are made in cam throw H, peripheral velocity $v$ of the vanes or interval $a$ of the camming sections, such changes must not result in producing a value for the mentioned stress which exceeds a limiting value therefor, such limiting value being determined by, among other factors, the strength of the materials used. I have also found that the value of the mentioned stress varies directly with the force $F_d$. Therefore, for any given machine there is a maximum practical value $F_{dmax}$ for $F_d$, the value $F_{dmax}$ being constant. This consideration leads to a rewriting of (19) as:

$$[k_6 H V^2 / a^2] \sec \phi \leq F_{dmax} \quad (20)$$

In (20), given that $F_{dmax}$ is a constant and assuming for the time being that H is constant, if sec $\phi$ is treated as a constant, then $v$ can be increased at least linearly with an increase in $a$. This is so since if $a$ is, say doubled, then $v$ can also be doubled without increasing the value of $V^2/a^2$, whereby $F_{dmax}$ is not exceeded. However, from (2) it is evident that the capacity C of the machine increases linearly with $v$. Therefore, the increase in $a$ permits at least a linear increase in capacity C.

As a matter of fact, with constant H an increase in $a$ permits a more than linear increase in $v$. This is so for the reason that by inspection of (18) it will be seen that, as $a$ increases in value, sec $\phi$ decreases in value to approach 1. However, from (20) it is evident that when sec $\phi$ decreases in value with increasing $a$, the decrease in sec $\phi$ permits the adding to the linear increase in $v$ of an extra increase in $v$ up to the point where the lefthand side of (20) equals the righthand side thereof. In order to determine how much extra increase in $v$ can be added to the linear increase in $v$, sec $\phi$ is taken for that point of the entire camming section profile (FIG. 15A) where the pressure angle $\phi$ is maximum.

It is also to be noted that when the peripheral velocity $v$ is fixed, as it is in many applications, and that when H is treated as a variable, and can be increased while keeping the mass of the vane constant an increase in $a$ permits increasing the capacity C of the machine almost as the square of $a$. This follows from the fact that when in (20) the term $V^2$ is a constant and when sec $\phi$ is also treated as a constant, if $a$ is say, doubled, the quantity H may be quadrupled without $F_{dmax}$ being exceeded by the lefthand side of 20. However, if H is quadrupled, it is apparent from (2) that, to an approximation, the doubling of $a$ produces a quadrupling of the capacity C.

Actually, the increase in C is affected by factors other than the square of the increase in $a$. This is so for two reasons. First, as H is increased, the value of sec $\phi$ increases somewhat, and, in order to continue to satisfy (20), this increase in sec $\phi$ must be compensated for by keeping H down to a value which is somewhat less than proportional to the square of $a$ as $a$ increases. On the other hand, since the groove width $h$ (which really determines capacity) may be less by a constant value than H as H increases, the factor increases percentagewise somewhat faster than H to thereby tend to offset any loss in capacity attributable to the increase in sec $\phi$. Therefore, in most instances the capacity C can be increased almost as the square of $a$ by increasing H to the highest value thereof which will satisfy (20).

From the foregoing, it is evident that it is highly advantageous to increase the interval $a$ occupied by the camming sections of the camming surfaces of the machine. How this may be done is discussed at length and specific structures to accomplish the desired object are claimed in my copending application Serial No. 853,912, filed November 18, 1959.

Figure 16:
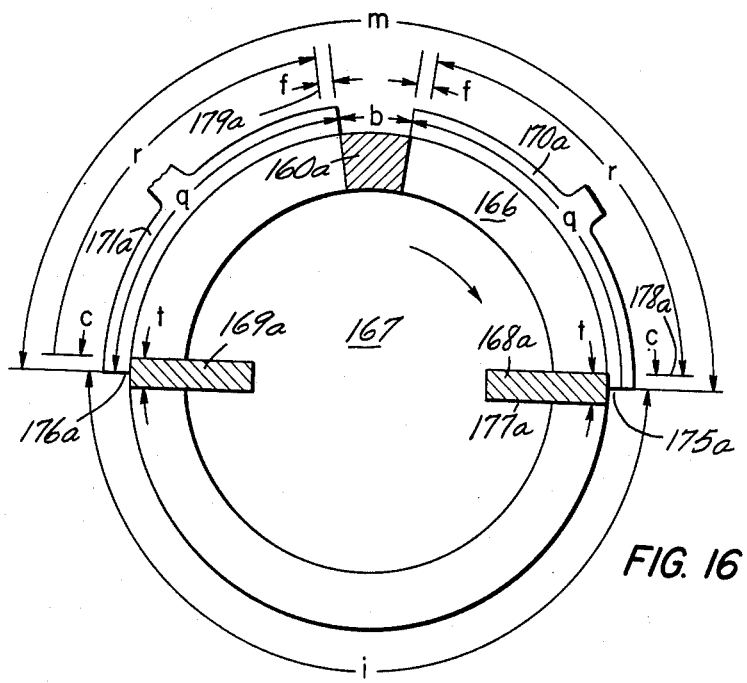
FIG. 16 is a schematic diagram of a cross section of a machine of the type shown in FIG. 3, the diagram supplementing FIG. 15 as an explanatory aid, and being representative of a rotary motion, aligned impulsion machine having one reaction block and two vanes.

FIG. 16 is a schematic diagram of a rotary motion aligned impulsion machine having the block proper portion 160a of a reaction block seated in a groove 166 formed in a clockwise rotating drum 167, two vanes 168a, 169a spaced in 180° relation around the drum and rotating therewith, a high pressure port 170a on one side of the block and a low pressure port 171a on the other side of the block.

The last mentioned copending application also shows that the general expression for the relationship between the vane operating angle (D) and the number of blocks per groove (B) is $$D = 360/B \qquad (21)$$

In extending the ports away from the block proper 160a, the interport angle $i$ between the extended port edges 175a, 176a should be no less than the vane angle of separation. Thus, the minimum value for $i$ is given by:

$$i = 360/nB \qquad (22)$$

The relationship $$m = 360/B(1-1/n) \qquad (24)$$

where $m$ is the non-working angle and $n$ is the number of vanes per block is also derived.

The maximum angle $q$ for each port is given by the general formula $$q = 180/B(1-1/n) - t \qquad (26)$$

where $t$ is the vane thickness.

The angle $q$ of any port minus the angles $c$ and $f$ within that port angle, defined as the vane support angle $r$ is given by the expressions $$r = 180/B(1-1/n) - \frac{t}{2} - b/2 - \frac{t}{2} \qquad (27)$$

or (where $b=2t$)

$$r = 180/B(1-1/n) - 2t \qquad (28)$$

Heretofore, it has been believed that the camming section associated with any port should terminate at its end towards the reaction block at an angular position which is spaced by greater than the angle $f$ from the near edge of the block proper in order thereby to permit use of the minimum possible axial throw H for the vane. It has also been believed that the camming section at its edge away from the block should terminate at an angular position which is spaced by greater than angle $c$ from the edge of the port farthest from the reaction block. The reasoning behind this latter belief is that, if the camming section were to extend any further, the vane would be in axial motion while being subjected to unequal pressure forces on opposite sides, but, if the vane were to be subjected to unequal lateral pressure while in axial motion, friction, stress and wear would be created by the binding of the vane against one side of its slot as a result of the unbalance of lateral pressure thereon.

To summarize the above, it has previously been believed that the angular camming interval $a$ associated with a given port should be less than the sub-port angle $r$ for that port. It has further been believed that the working interval $i$ should be maximized at the expense of the expense of the camming intervals $a$.

I have found that those previously held beliefs are mistaken, and that a significant improvement in capacity or horsepower can be realized by proceeding contrary to those beliefs. Specifically, I have found that, in contrast to what has previously been taught, the camming intervals $a$ should be increased in any one or more of the ways of (I) extending $a$ towards the block to an angular position which in any event is closer than $t/2$ to the near edge of the block and which may be the center line of the block, (II) extending $a$ away from the block to an angular position which in any event is spaced closer than $t/2$ to that edge of the associated port which is the far edge in relation to the block, and which angular position may extend beyond such far edge, and (III) employing more than two vanes per block, whereby each vane working interval $i$ is decreased to permit a corresponding increase in the camming interval $a$ which lie to either side of that working interval.

Figure 18:
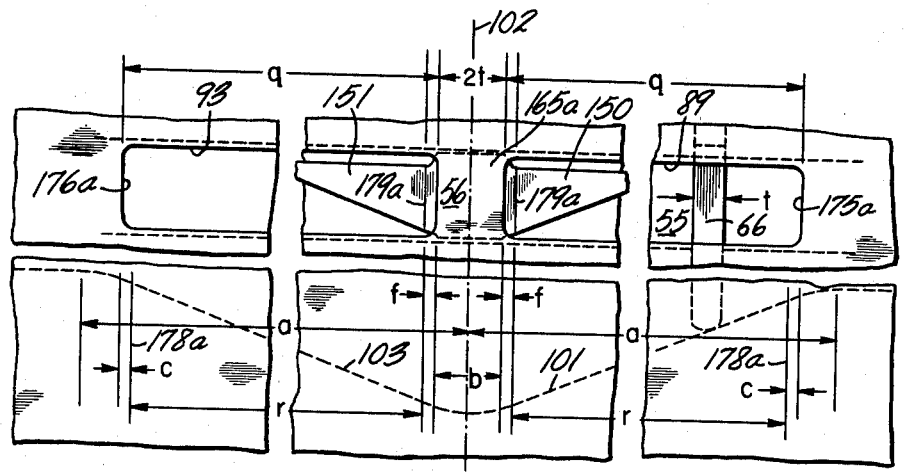
FIG. 18 is a developed view corresponding to the developed views of FIGS. 5 and 15 and showing the extent of the camming intervals in the FIG. 3 machine.

FIG. 18 illustrates ways $I$ and $II$ of increasing camming intervals $a$. In respect to I, each of the camming sections 101 and 103 extend all the way to the center line 102 of the reaction block 56. In order to so increase those camming sections it is necessary to increase the throw H of the vanes beyond the maximum value of H which could be used if the camming intervals terminated short of positions 179a. However, the percentage increase in H which is necessary to carry the intervals $a$ all the way to the center line of the reaction block is small in relation to the percentage increase in $a$ which such increase in H permits. This is so for two reasons. First, inasmuch as the camming sections 101 and 103 follow, as described, a curve for which both the first and second derivatives are zero at the ends of the camming sections, those sections will have segments of relatively flat profile at the ends thereof adjacent the reaction block, and, for those flat profile segments, $a$ increases much faster than H. Second, for reasons heretofore described, the winged construction of the reaction block permits the block proper 165a of the axially self-adjusting block to be reduced to the optimum angular thickness of 2t, and such reduction of the block thickness keeps the increase in H which is required to a much lower value than would be necessitated if the thickness of the block proper were to be substantially in excess of 2t.

When the camming sections 101 and 103 are so extended to the center line 102 of the reaction block, the portions of those sections extending from angular positions 178a to center line 102 are equal to:

$$180/B(1-1/n)-t/2 \qquad (29)$$

By comparison with (28) it will be seen that those portions alone of the camming sections exceed the subport angle $r$ of (28) which in turn is larger than the entire camming interval hitherto considered as the practical maximum.

In respect to way II of increasing the camming intervals $a$, for sections 101, 103, as shown by FIG. 18, those camming sections extend away from the reaction block beyond the positions 178a and in fact, beyond the edges 175a, 176a of ports 89 and 93 which are the far edges of those ports in relation to the reaction block. The segments of camming sections 101, 103 which are to the far side of angular positions 178a are segments occupying angular intervals wherein a vane is subject to an unbalance of lateral pressure forces. However, I have found that because the sections 101 and 103 follow curves wherein the first and second derivatives are zero at the point of joinder of each of those sections with the adjacent dwell section of the camming surface, the outlying end segments of those sections are sufficiently flat in profile to permit such sections to extend a short distance into the region of pressure unbalance of the vanes. Specifically, each such end segment may, at the least, extend far enough into the region of pressure unbalance to (1) permit clearance to be taken up between the camming surface and the cam follower end faces of the vanes, and, (2) stress the vanes by a driving force $F_d$ up to the value of $F_{dmax}$ which is the maximum value permitted.

When the camming sections 101 and 103 are extended only so far as the edges 175a, 176a of ports 89 and 93, the portions of those camming sections between angular positions 179a and edges 175a, 176a are portions which each have an angular interval of:

$$180/B(1-1/n)-3t/2 \qquad (30)$$

which is greater than the sub-port angle $r$ given by (28). Thus each of those portions of themselves exceed the maximum value of camming interval which has hitherto been considered practical.

Figure 17:
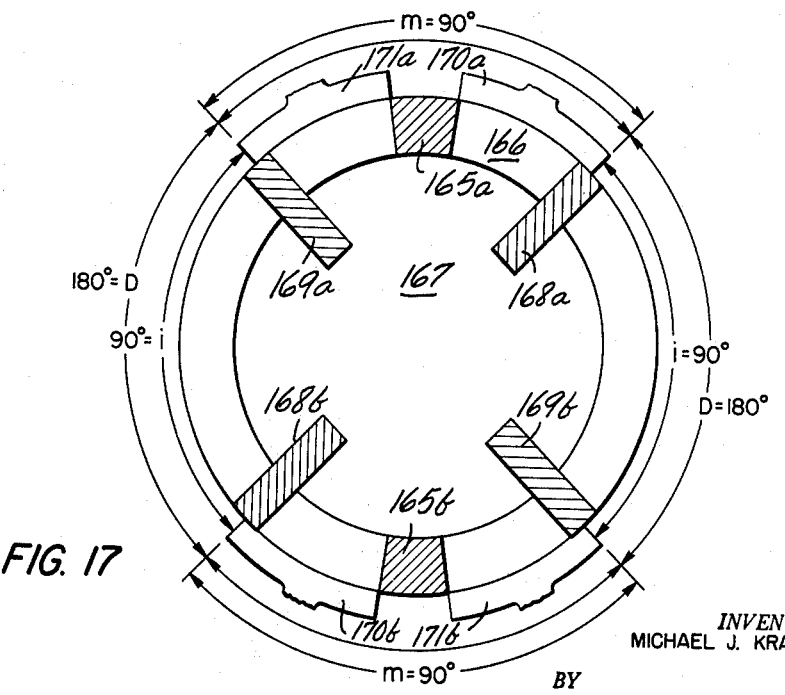
FIG. 17 is a schematic diagram of a cross section of a machine of the type shown in FIG. 3, the diagram supplementing FIGS. 15 and 16 as an explanatory aid, and being representative of a machine having two reaction blocks and four vanes.
Figure 19:
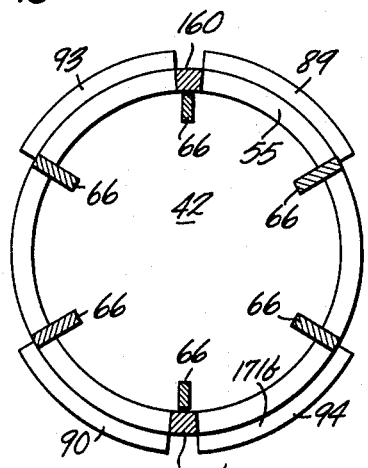
FIG. 19 is a schematic diagram of a cross section of the FIG. 3 machine as modified to have six vanes.
Figure 20:
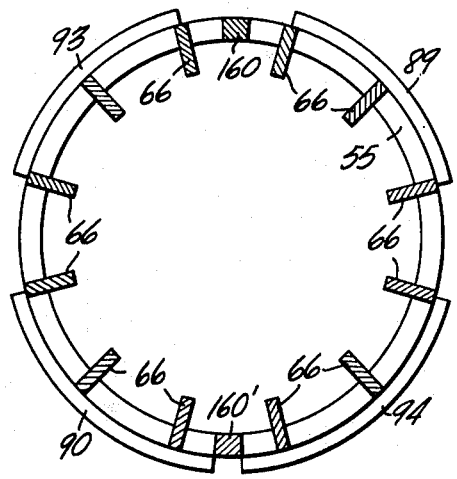
FIG. 20 is a schematic diagram of a cross section of the FIG. 3 machine as modified to have twelve vanes.

A comparison of FIGURES 19, 4 and 20 with FIGURE 17 demonstrates the increase in the camming interval $a$ which is obtainable by increasing the number of vanes. In FIGURE 19 there are three vanes per block for each of two blocks as compared with FIGURE 17 wherein there are only two vanes per block for each of two blocks. The feature is also described and more fully claimed in my co-pending application Serial No. 853,912 referred to above.

The above described embodiment being exemplary only, it will be understood that the invention hereof comprehends embodiments differing in form and/or detail from the above-described embodiments. Further, although the embodiments described herein are suitable for high speed operation, the invention hereof is applicable to rotary motion aligned impulsion machines designed for use at any speed of operation.

While specific embodiments of the invention have been shown in which the cylindrical sleeve (or casing) is stationary and the drum rotates, the principles of the invention may be applied and used in machinery designed to have the sleeve (or casing) rotate while the drum remains stationary. In other modifications, the vanes may move radially in radial (instead of axial) slots, the relatively rotatable members having planar faces, one face having an annular groove and the other having the reaction block affixed thereto and seated in the groove. Such radial machine would also differ from the axial machine shown in FIGS. 3 and 4 in that the flow of fluid between the groove and the ports would be in an axial direction, the variations from dwell position of the cam guiding surfaces for imparting transverse movement to the one or more vanes would be radial rather than axial variations, and, in respect to the reaction block and vanes, what was axial in FIGS. 3 and 4 would become radial and what was radial in FIGS. 3 and 4 would become axial. As specific illustrations, in the radial machine the reaction block would project axially rather than radially from the stationary member into the annular groove of the rotor (although the extensions 150, 151 would still project angularly from the reaction block), and, in a vane of the type shown in FIG. 4, the apertures 120, 122 would run axially through the vane between axially opposite margins thereof rather than (as specifically shown in FIG. 4) radially through the vane between radially opposite margins thereof.

Accordingly, the invention is not to be considered as limited save as is consonant with the scope of the following claims.

I claim:

1. Apparatus comprising first and second members relatively rotatable about a common axis, said second member having formed therein at least one continuous fluid-receiving groove and at least one slot extending transversely of said groove, at least on block seated in and extending transversely from side to side of said groove in fixed position relative to said first member in the angular direction around said axis, a vane transversely movable in said slot between first and second positions at which, respectively, said vane obstructs said groove and said groove is unobstructed by said vane, vane guide means disposed adjacent said second member to provide a surface adapted by contacting a cam follower on said vane to intermittently move said vane transversely during relative rotation of said members so as to position said vane at said second position when passing by said block and at said first position at intervening times, port means on one side of said block to admit fluid into the groove and port means on the other side of said block to discharge fluid from the groove, the improvement in said machine in which said surface is comprised to one side of the centerline of said block of a dwell portion and of a camming section by which, respectively, said vane is maintained transversely stationary and is cammed transversely during said relative rotation, said portion and section having a junction at an end of said section, said section being between said portion and centerline, said section having adjacent said junction a profile conforming to a curve for which both the first and the second derivatives of the transverse displacement on said curve with respect to the corresponding angular displacement thereon are equal to zero at a point on said curve coincident with said junction, and the third derivative of transverse displacement with respect to angular displacement for said section having a finite value at every point on said section.

2. The machine described in claim 1 in which said surface is further comprised on the other side of said centerline of a dwell portion and of another camming section disposed between such portion and centerline and having a junction with such portion at an end of such section, said other section having adjacent said last-named junction a profile conforming to a curve for which both the first and the second derivatives of the transverse displacement on such curve with respect to the corresponding angular displacement thereon are equal to zero at a point on such curve coincident with said last-named junction, the third derivative of transverse displacement with respect to angular displacement for said other section having a finite value at every point on said other section, and in which each of said sections angularly extends away from said centerline beyond the edge farthest from said centerline of the port means adjacent that section.

3. The machine described in claim 1 in which said camming section has adjacent an end thereof towards said centerline a profile conforming to a curve for which both the first and the second derivatives of the transverse displacement on such curve with respect to the corresponding angular displacement thereon are equal to zero at a point on such curve coincident with such end.

4. The machine described in claim 2 in which each of said camming sections has adjacent an end thereof towards said centerline a profile conforming to a curve for which both the first and the second derivatives of the transverse displacement on such curve with respect to the corresponding angular displacement thereon are equal to zero at a point on such curve coincident with such end, and in which each of said sections angularly extends towards said centerline beyond the angular extremity adjacent such section of said block.

5. The machine described in claim 1 in which said second member is a cylindrical drum and said first member is a cylindrical bushing surrounding said drum.

6. The machine described in claim 5 in which said drum is rotatable and said bushing is stationary.

7. The machine described in claim 1 in which said vane is transversely stationary in said first position during at least a portion of said first position of obstructing said groove.

8. The machine described in claim 2 in which the number of blocks is the same as the number of said first vane positions of obstructing said groove, and the number of pairs of camming sections is the same as the number of said blocks, and all are symmetrically arranged and in which each such camming section has adjacent each of its ends a profile conforming to a curve for which both the first and the second derivatives of the transverse displacement on the curve with respect to the corresponding angular displacement thereon are equal to zero at a point on such curve coincident with the corresponding end of such section, and, further, the third derivative of transverse displacement with respect to angular displacement for each such section has a finite value at every point on such section.

9. Apparatus comprising first and second members relatively rotatable about a common axis, said second member having formed therein at least one continuous fluid-receiving groove and at least one slot extending transversely of said groove, at least one block seated in and extending transversely from side to side of said groove in fixed position relative to said first member in the angular direction around said axis, a vane transversely movable in said slot between first and second positions at which, respectively, said vane obstructs said groove and said groove is unobstructed by said vane, vane guide means disposed adjacent said second member to provide a surface adapted by contacting a cam follower on said vane to intermittently move said vane transversely during relative rotation of said members so as to position said vane at said second position when passing by said block and at said first position at intervening times, means on one side of said block to admit fluid into the groove and means on the other side of said block to discharge fluid from the groove, the improvement in said machine in which said surface is comprised to one side of the centerline of said block of a dwell portion and of a camming section by which, respectively, said vane is maintained transversely stationary and is cammed transversely during said relative rotation, said section being between said portion and the centerline, and said camming section having adjacent an end thereof towards said centerline a profile conforming to a curve for which both the first and the second derivatives of the transverse displacement on such curve with respect to the corresponding angular displacement thereon are equal to zero at a point on such curve coincident with such end, the third derivative of transverse displacement with respect to angular displacement for said section having a finite value at every point on said section, and said section extending angularly towards said centerline beyond the angular extremity adjacent said section of said block.

References Cited by the Examiner

UNITED STATES PATENTS

| | | | |
|---|---|---|---|
| 1,444,712 | 2/23 | Smith | 103—139 |
| 2,154,457 | 4/39 | Knapp | 103—139 |
| 2,980,030 | 4/61 | Couturier | 103—139 |

FOREIGN PATENTS

| | | |
|---|---|---|
| 1,141,233 | 8/57 | France. |
| 219,902 | 1907 | Germany. |
| 21,188 | 9/10 | Great Britain. |
| 602,465 | 5/48 | Great Britain. |

KARL J. ALBRECHT, *Primary Examiner.*

LAURENCE V. EFNER, JOSEPH H. BRANSON, JR.,
*Examiners.*